INVENTORS
JOHN L. MARGAROLI
EARL J. HESSE
BY
ATTORNEYS

United States Patent Office 3,469,612
Patented Sept. 30, 1969

3,469,612
CHUCKS FOR FRUIT PITTING MACHINES
John L. Margaroli and Earl J. Hesse, Oakland, Calif., assignors to Geo. W. Ashlock Co., San Leandro, Calif., a corporation of California
Filed Apr. 17, 1967, Ser. No. 631,488
Int. Cl. A23n *3/00;* A47j *23/00*
U.S. Cl. 146—17                                2 Claims

ABSTRACT OF THE DISCLOSURE

For the support of the lower ends of dates and prunes while pits are being removed from the lower ends, a rubber chuck having a centrally disposed pit ejector opening, an annular upstanding wall defining a frustoconical fruit support pocket having an included angle of about 35–45° for prunes and about 65–75° for dates, the pocket being wider at its mouth than it is deep.

SUMMARY OF INVENTION

A rubber pitting chuck adapted to receive and support the lower end and but a minor fraction of the total length of a date or a prune to be pitted, said chuck comprising an annular member having its upper and lower ends shaped to define therein, respectively, a frustoconical fruit receiving and supporting cavity, and a frustospherical relief cavity, and having said cavities interconnected by a cylindrical pit ejection passageway, said cavities and passageways being coaxial, said fruit receiving and supporting cavity having an included angle of about 35–45° for prunes and about 65–75° for dates and having a maximum width dimension greater than its depth.

The primary object of the invention is to provide pitting chucks for dates and prunes adapted to minimize obstruction to pit removal and to minimize damage during pit removal to both the meat of the fruit and the chucks.

This and other objects and advantages of the invention will be apparent from the following description taken in conjunction with the drawing forming part of this specification, and in which.

Figure 1:
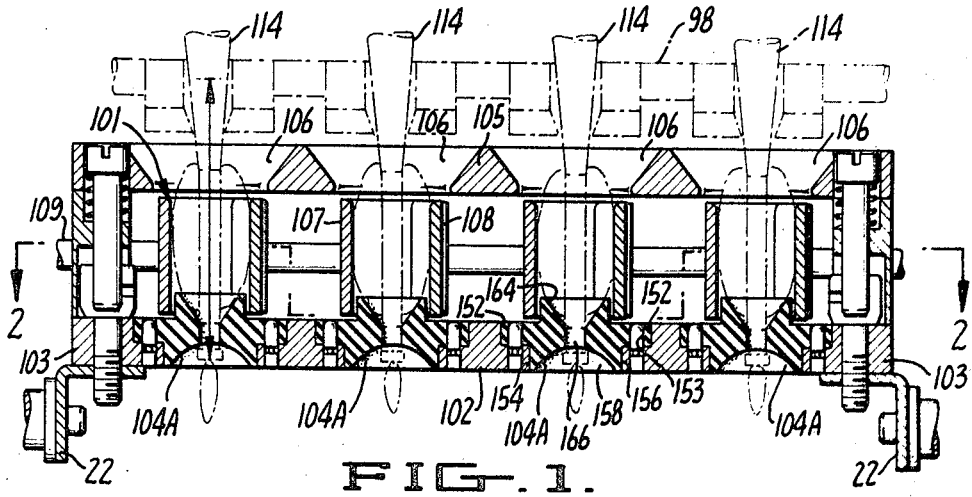
FIG. 1 is a view in vertical section, taken at the pitting station, of a portion of a fruit pitting machine embodying one of the improved pitting chucks of the invention.
Figure 2:
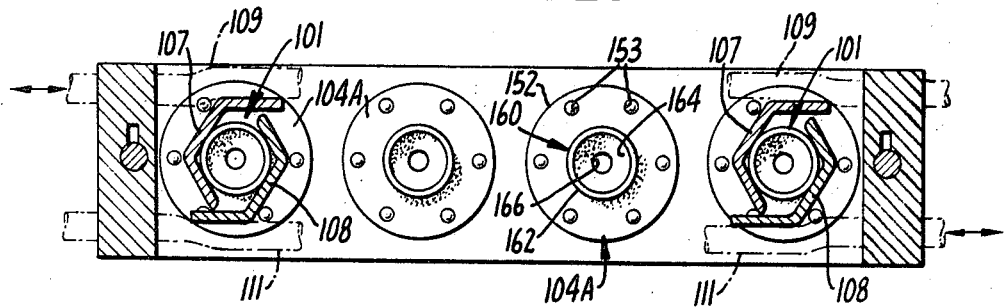
FIG. 2 is a view taken along lines 2—2 of FIG. 1.

The fruit pitting machine shown in part in FIGS. 1–2 is, except for the chuck improvement of the invention, essentially the same as the one shown and described in United States Letters Patent 2,688,352 to George W. Ashlock, Jr., and reference may be had to said patent for further details as to the background, structural details, and mode of operation of the specific type of machine constituting the operational environment of the present invention. In particular, the details of FIGS. 3 and 6 of said patent are followed and shown herein, and reference numerals corresponding to those employed in FIGS. 3 and 6 of said patent are used herein to designate machine parts essentially corresponding to those therein described.

Thus, pitting chucks 104 in the form of annular rubber plugs are removably mounted in the apertures formed in base plate 102; the base plate 102 has ends 103 secured to conveyor chains 22; a guide plate 105 is mounted on the base plate ends 103, the guide plate having an inwardly tapering opening 106 over each fruit receiving cavity 101; the fruit cavity side walls are defined by members 107 and 108 mounted cooperatively opposite one another to provide cavities 101 of variable size, the members 107 and 108 being mounted, respectively, on two-way, cam-operated, push-pull rods 109 and 111; pitting knives 114; and a fruit stripper plate 98.

Figures 3, 4:
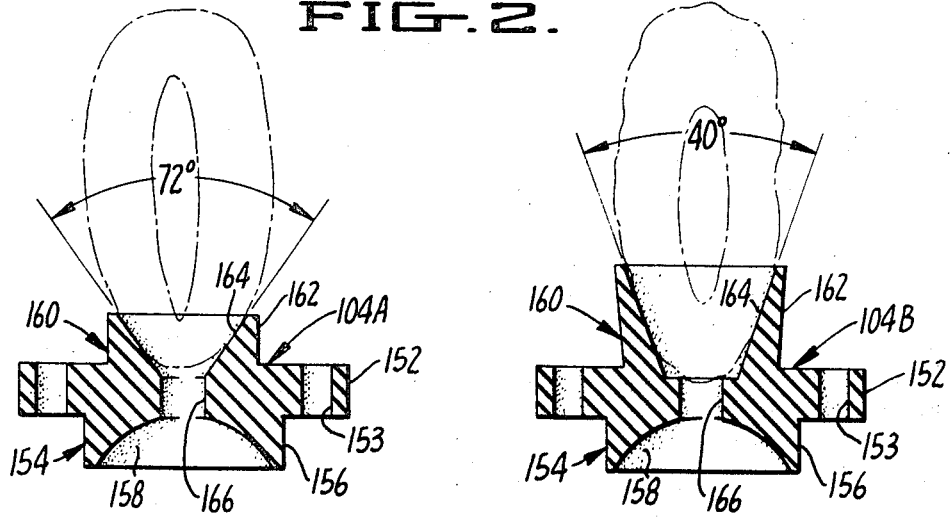
FIG. 3 is a view in vertical diametral section of one of the pitting chucks of the invention, the same being shown at 1.5 times full scale.
FIG. 4 is a view similar to that of FIG. 3 of another of the pitting chucks of the invention, the same being shown at 1.5 times full scale.

The present invention resides in the pitting chucks 104, one form of which, 104A, is shown in FIGS. 1–3 herein and a second form of which, 104B, is shown in FIG. 4 herein.

Chuck 104A, a date pitting chuck, and chuck 104B, a prune pitting chuck, each comprise a radial flange 152 having a plurality of equally spaced mounting pin apertures 153, a depending annular wall 154 having an external surface 156 and an internal surface defining a frustospherical cavity 158, an upwardly extending annular wall 160 having an external surface 162 and an internal surface defining a frustoconical pocket 164, and an intermediate annular surface defining a cylindrical pit ejection passageway 166. In each of the chucks 104A and 104B the width dimension of the mouth of pocket 164 is greater than the depth of the pocket. The preferred ratio for chuck 104A of maximum pocket width to pocket depth is 2.2. The preferred ratio for chuck 104B of maximum width to pocket depth is 1.3.

It is of importance that in chuck 104A the narrow end of pocket 164 be equal in diameter to the diameter of pit ejection passageway 166.

For satisfactory pitting results, the included angles of the chucks should be kept within the ranges of about 35° to about 45° for chuck 104B and of about 65° to about 75° for chuck 104A. The preferred included angle for chuck 104B is 40° and the preferred included angle for chuck 104A is 72°.

The chucks 104A and 105B are preferably of a Shore durometer hardness of 48–52, i.e., 50±2.

What is claimed is:

1. A chuck adapted to receive and support dates, for pit removal lengthwise thereof through the ends so supported, comprising an annular member formed of rubber, said member having formed in its upper end a frustoconical fruit receiving and supporting cavity of an included angle in the range of about 65–75°, having formed in its lower end an outwardly and downwardly enlarging frustospherical relief cavity, and having formed therein in intermediate and intercommunicating relation with said cavities a cylindrical pit ejection passageway, said cavities and said passageway being disposed in coaxial relation with each other, said frustoconical cavity having a width to depth ratio of about 2.2 and having a depth less than one-half of the length of a date to be pitted, the lower end of said frustoconical cavity having a diameter equal to the diameter of said pit ejection passageway, said relief cavity having a maximum width greater than the maximum width of said frustoconical cavity.

2. A chuck adapted to receive and support prunes, for pit removal lengthwise thereof through the ends so supported, comprising an annular member formed of rubber, said member having formed in its upper end a frustoconical fruit receiving and supporting cavity of an included angle in the range of about 35–45°, having formed in its lower end an outwardly and downwardly enlarging frustospherical relief cavity, and having formed therein in intermediate and intercommunicating relation with said cavities a cylindrical pit ejection passageway, said cavities and said passageway being disposed in coaxial relation with each other, said frustoconical cavity having a width to depth ratio of about 1.3 and having a depth less than one-half of the length of a prune, said relief cavity having a maximum width greater than the maximum width of said frustoconical cavity.

References Cited

UNITED STATES PATENTS

| | | | |
|---|---|---|---|
| 2,283,714 | 5/1942 | Wolff | 146—27 |
| 2,528,294 | 10/1950 | Ashlock | 146—27 X |
| 2,688,352 | 9/1954 | Ashlock | 146—17 |

W. GRAYDON ABERCROMBIE, Primary Examiner

U.S. Cl. X.R.

146—27